United States Patent
Usui et al.

(10) Patent No.: US 11,879,815 B2
(45) Date of Patent: Jan. 23, 2024

(54) NON-CONTACT NON-DESTRUCTIVE INSPECTION SYSTEM, SIGNAL PROCESSING DEVICE, AND NON-CONTACT NON-DESTRUCTIVE INSPECTION METHOD

(71) Applicant: KABUSHIKI KAISHA TOSHIBA, Tokyo (JP)

(72) Inventors: Takashi Usui, Saitama (JP); Hiroshi Ohno, Chuo (JP); Kazuo Watabe, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 17/651,602

(22) Filed: Feb. 18, 2022

(65) Prior Publication Data

US 2022/0170813 A1    Jun. 2, 2022

Related U.S. Application Data

(63) Continuation of application No. PCT/JP2020/021460, filed on May 29, 2020.

(51) Int. Cl.
*G01M 5/00* (2006.01)

(52) U.S. Cl.
CPC ........ *G01M 5/0066* (2013.01); *G01M 5/0033* (2013.01); *G01M 5/0008* (2013.01)

(58) Field of Classification Search
None
See application file for complete search history.

(56) References Cited

U.S. PATENT DOCUMENTS

2017/0336365 A1* 11/2017 Watabe .............. G01N 29/4463
2018/0266999 A1    9/2018 Usui

FOREIGN PATENT DOCUMENTS

| JP | 2007-085851 A | 4/2007 |
|---|---|---|
| JP | 2007-232373 A | 9/2007 |
| JP | 2013-108920 A | 6/2013 |
| JP | 2018-155662 A | 10/2018 |
| JP | 2019-194541 A | 11/2019 |
| WO | WO 2018/168219 A1 | 9/2018 |

* cited by examiner

*Primary Examiner* — Raul J Rios Russo
*Assistant Examiner* — Carl F. R. Tchatchouang
(74) *Attorney, Agent, or Firm* — Oblon, McClelland, Maier & Neustadt, L.L.P.

(57) ABSTRACT

A non-contact non-destructive inspection system according to an embodiment includes a sensor, a velocity detection unit, and a damage detection unit. The sensor detects a second elastic wave emitted to a medium surrounding an inspection object due to a first elastic wave propagating through the inspection object. The velocity detection unit detects a velocity of the first elastic wave based on a wavefront angle of the second elastic wave and a velocity of the second elastic wave. The damage detection unit detects damage to the inspection object based on the velocity of the first elastic wave.

11 Claims, 15 Drawing Sheets

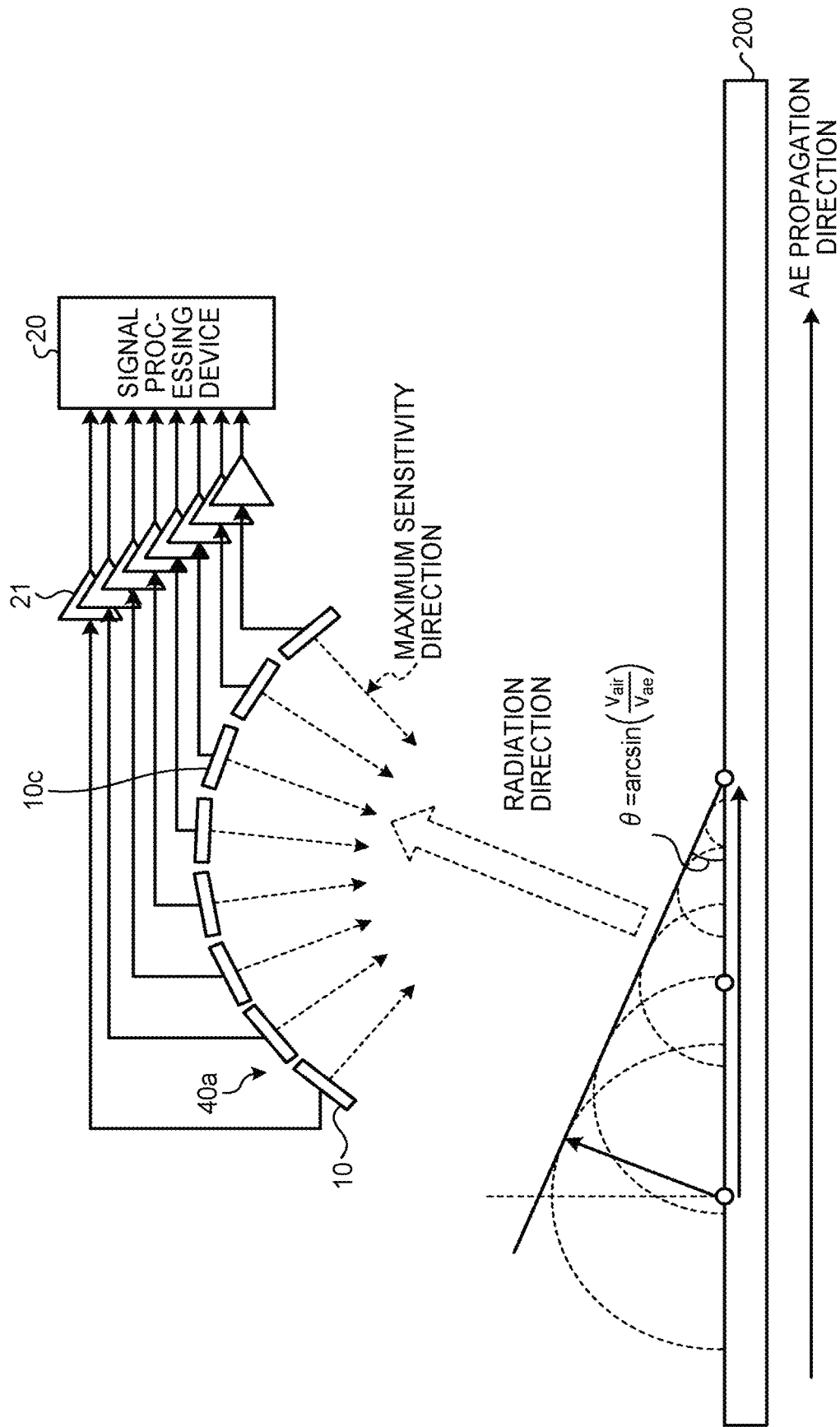

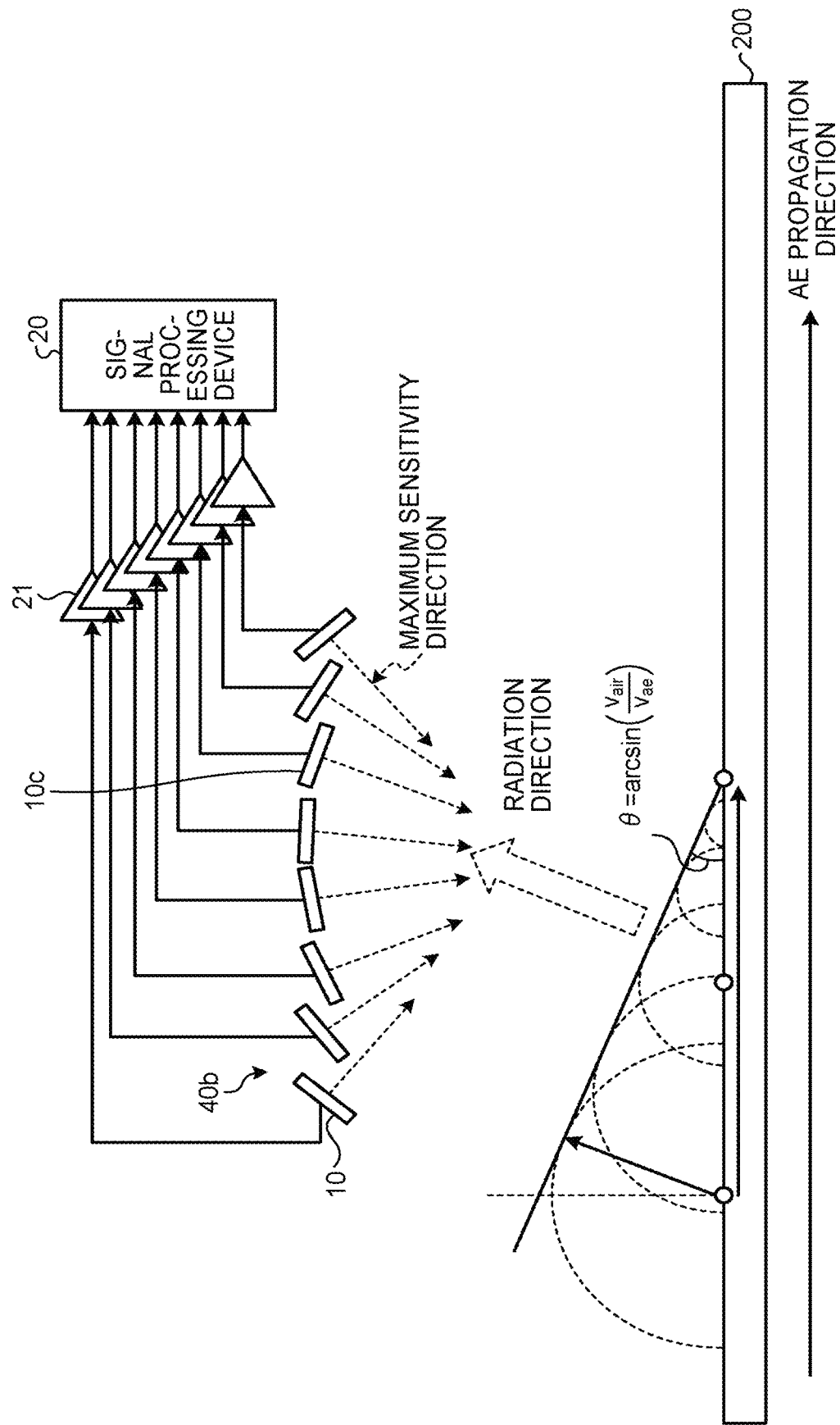

NON-CONTACT NON-DESTRUCTIVE INSPECTION SYSTEM, SIGNAL PROCESSING DEVICE, AND NON-CONTACT NON-DESTRUCTIVE INSPECTION METHOD

CROSS-REFERENCE TO RELATED APPLICATION

This application is a continuation of International Application No. PCT/JP2020/021460, filed on May 29, 2020, the entire contents of which are incorporated herein by reference.

FIELD

Embodiments described herein relate generally to a non-contact non-destructive inspection system, a signal processing device, and a non-contact non-destructive inspection method.

BACKGROUND

In recent years, there are revealed problems that are associated with aging of structures such as bridges constructed in the high economic growth period. Since the magnitude of damage to be caused by an accident in the structure is immeasurable, there have been known techniques for monitoring states of structures. For example, a technique is known for detecting damage to a structure by an acoustic emission (AE) method that uses a high-sensitivity sensor to detect an elastic wave occurring with generation or development of an internal crack of the structure.

However, the conventional techniques have a difficulty in performing non-contact evaluation of the soundness of the inspection objects.

BRIEF DESCRIPTION OF THE DRAWINGS

FIG. 11A is a diagram illustrating an example of a sensor array according to a third embodiment;

FIG. 11B is a diagram illustrating an example of a sensor array according to the third embodiment;

DETAILED DESCRIPTION

Figure 1:
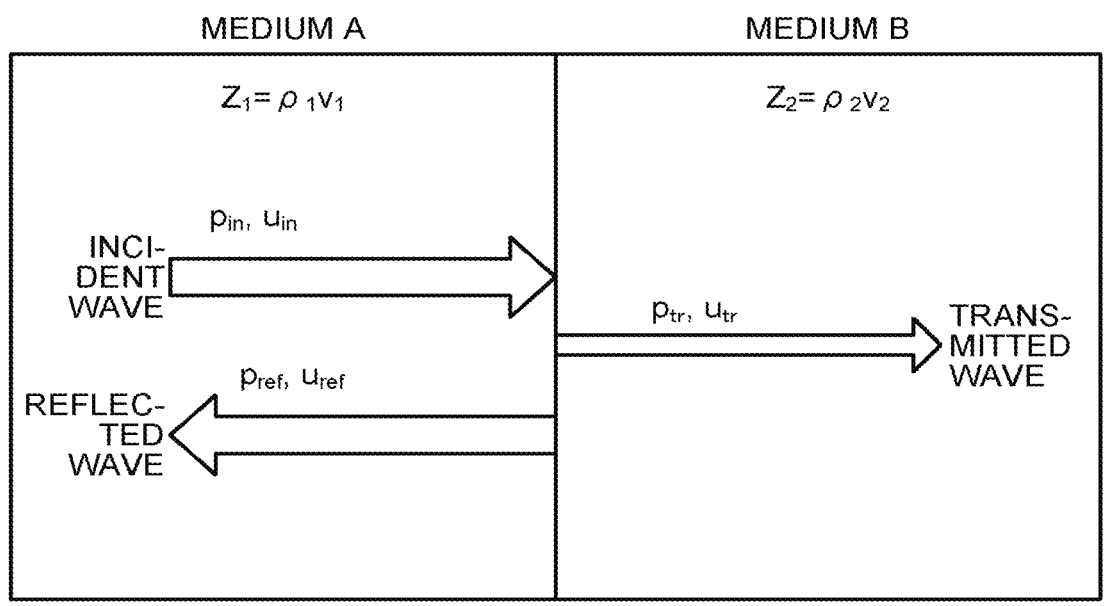
FIG. 1 is a conceptual diagram illustrating reflection and transmission of sound at a material boundary.

A non-contact non-destructive inspection system according to an embodiment includes a sensor, a velocity detection unit, and a damage detection unit. The sensor is configured to detect a second elastic wave emitted to a medium surrounding an inspection object due to a first elastic wave propagating through the inspection object. The velocity detection unit is configured to detect a velocity of the first elastic wave based on a wavefront angle of the second elastic wave and a velocity of the second elastic wave. The damage detection unit is configured to detect damage to the inspection object based on the velocity of the first elastic wave.

Hereinafter, embodiments of a non-contact non-destructive inspection system, a signal processing device, and a non-contact non-destructive inspection method will be described in detail with reference to the accompanying drawings.

Acoustic emission represents an elastic wave generated with the development of a fatigue crack in an inspection object such as a material. In the AE method, the elastic wave is detected as a voltage signal (AE signal) by an AE sensor using a piezoelectric element. Since the AE signal is detected as a sign before breakage of the inspection object occurs, the generation frequency and the signal strength of the AE signal are useful as indices representing the soundness of the inspection object. Therefore, a technique of detecting a sign of deterioration of a structure by the AE method has been actively studied. In particular, in corrosion diagnosis of oil tanks, manufacturing processes of mechanical devices, and the like, detection techniques using the AE method are widely used mainly in Europe and the United States, and standardization of the detection techniques of the AE method have been in progress.

Since the AE method detects an elastic wave generated in an inspection object using a contact sensor, the AE method is not applicable when the sensor cannot be directly installed on the structure. For example, application of the AE method would be difficult in a case where the inspection object and the inspection device relatively move, such as an inspection in a factory line or by a drone. In addition, direct sensor contact may be difficult due to temperature, quality control reasons, and the like. On the other hand, in the case of non-contact inspection, there is a known method of generating an ultrasonic wave from the outside and determining the presence or absence of damage based on the characteristics of the signal reflected by or transmitted through the inspection object. Even in this case, it is not possible to obtain information related to the elastic wave generated in the inspection object.

The first embodiment below will describe a non-contact non-destructive inspection system that performs non-contact detection of the velocity and the direction of an elastic wave propagating through an inspection object and evaluates soundness of the inspection object based on detected elastic wave information.

First Embodiment

First, acoustic impedance will be described. The ratio between a sound pressure p with a particle velocity u is expressed as an acoustic impedance Z as in the following equation (1).

$$Z = \frac{p}{u} [Ns/m^3] \quad (1)$$

The acoustic impedance Z can also be expressed as Z=ρv using a density ρ and a sound velocity v. The density ρ and the sound velocity v are values specific to the material, and thus, the acoustic impedance Z also has values specific to the material.

Next, transmission and reflection at a material boundary will be described.

FIG. 1 is a conceptual diagram illustrating reflection and transmission of sound at a material boundary. When a sound wave having a sound pressure pin and a particle velocity $u_{in}$ is incident on a medium B having a density $\rho_2$ and a sound velocity $v_2$ from a medium A having a density $\rho_1$ and a sound velocity $v_1$, a part of the sound wave is transmitted to the medium B as a transmitted wave having a sound pressure $p_{tr}$ and a particle velocity $u_{tr}$, while a part of the sound wave is reflected to the medium A at a boundary surface between the media A and B as a reflected wave having a sound pressure $p_{ref}$ and a particle velocity $u_{ref}$.

Based on the condition that the sound pressure and the particle velocity are continuous across the left and right of the boundary surface, a sound pressure transmittance $K_{tr}$ and a sound pressure reflectance $K_{ref}$ are expressed by the following equations (2) and (3), respectively.

$$K_{tr} = \frac{p_{tr}}{p_{in}} = \frac{2\rho_2 v_2}{\rho_1 v_1 + \rho_2 v_2} = \frac{2Z_2}{Z_1 + Z_2} \quad (2)$$

$$K_{ref} = \frac{p_{ref}}{p_{in}} = \frac{\rho_2 v_2 - \rho_1 v_1}{\rho_1 v_1 + \rho_2 v_2} = \frac{Z_2 - Z_1}{Z_1 + Z_2} \quad (3)$$

Figure 2:
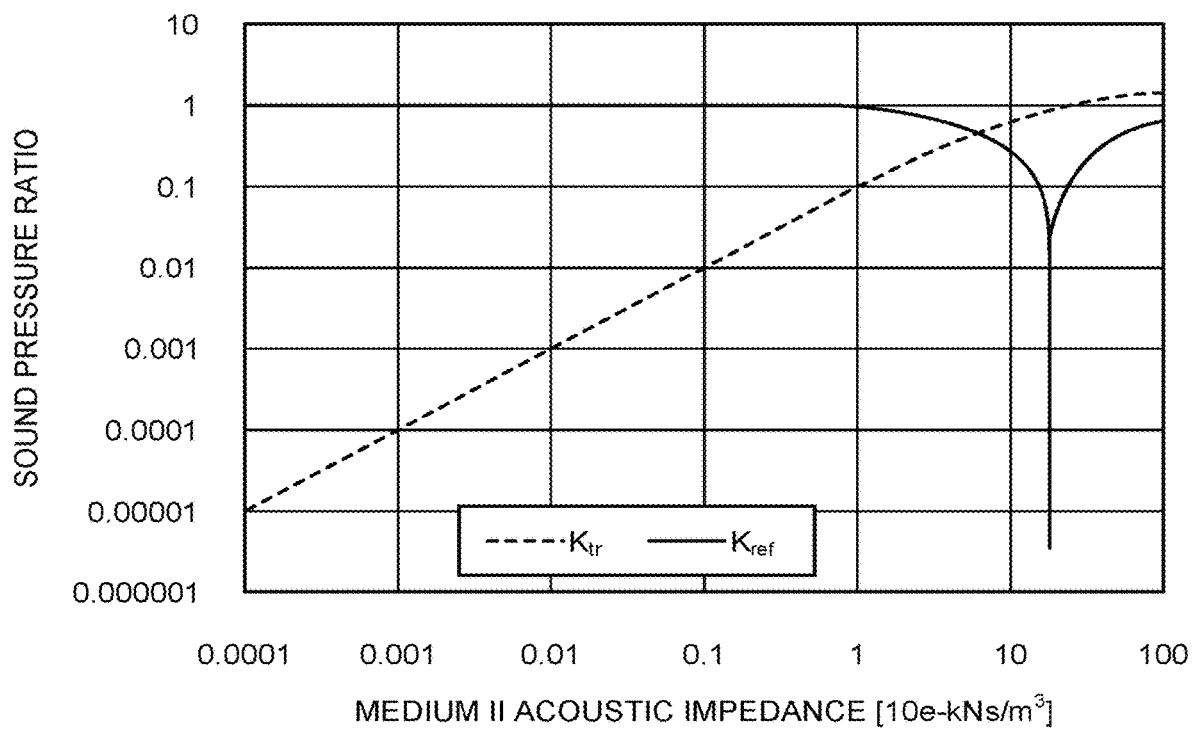
FIG. 2 is a diagram illustrating a relationship between a transmitted sound pressure ratio/reflected sound pressure ratio and acoustic impedance.

The acoustic impedance is a material-specific value, for which a representative numerical value exists. In the case of aluminum as an example of the medium A, the acoustic impedance is 17.3 e-6 [Ns/m³]. FIG. 2 illustrates the sound pressure transmittance $K_{tr}$ and the sound pressure reflectance $K_{ref}$ when the sound wave is incident on the medium B different from aluminum.

FIG. 2 is a diagram illustrating a relationship between the transmitted sound pressure ratio/reflected sound pressure ratio and the acoustic impedance. The horizontal axis represents the acoustic impedance of the medium B. The vertical axis represents each sound pressure ratio in the cases of reflection and transmission. For example, when the medium B is the air, its acoustic impedance is approximately 0.00041 [10e-6 Ns/m³]. The sound pressure transmittance at this time is 4.73977e-5, and the sound pressure reflectance is 0.999953. The transmission loss of energy is −10 $\log_{10}$ (1−$K_{ref}^2$)=−40.23 [dB]. That is, the sound wave is transmitted from the metal (aluminum in the first embodiment) into the air with a transmission loss of approximately 40 dB.

Next, the sensor of the first embodiment will be described.

Example of Sensor

Figure 3:
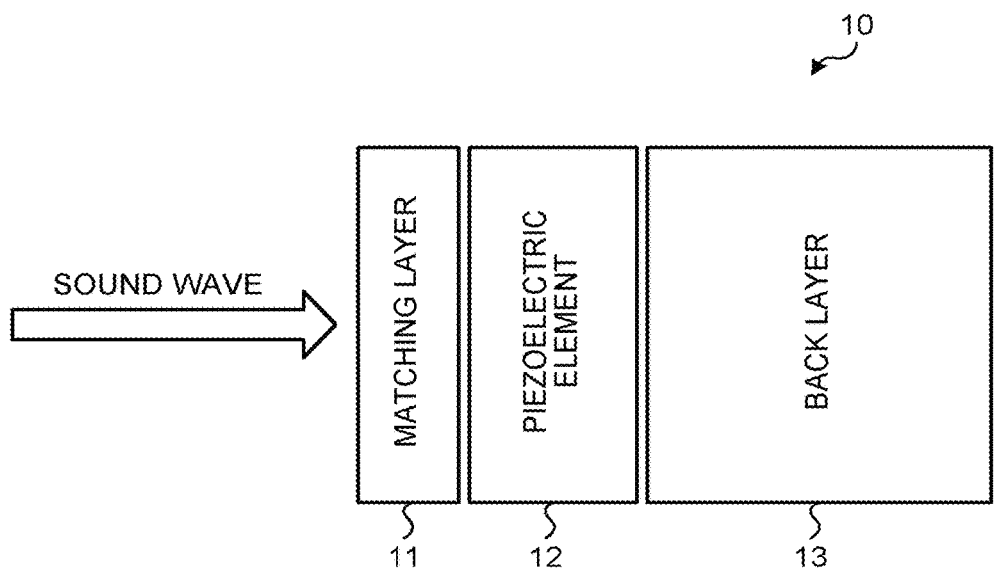
FIG. 3 is a schematic diagram of a sensor according to a first embodiment.
Figure 4A:
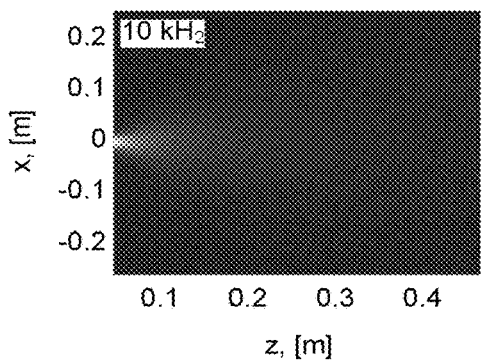
FIG. 4A is a diagram illustrating a relationship between a frequency (in the case of 10 kHz) and directivity of an ultrasonic sensor.
Figure 4B:
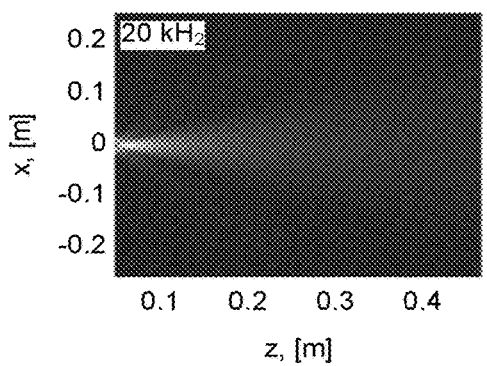
FIG. 4B is a diagram illustrating a relationship between a frequency (in the case of 20 kHz) and directivity of an ultrasonic sensor.
Figure 4C:
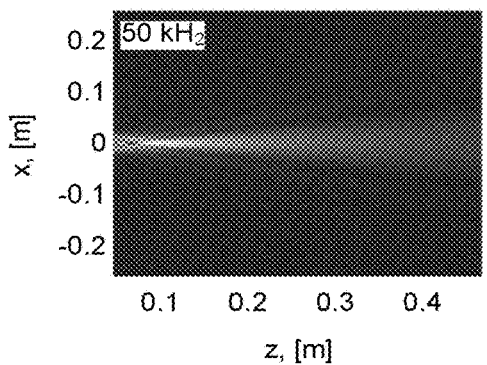
FIG. 4C is a diagram illustrating a relationship between a frequency (in the case of 50 kHz) and directivity of an ultrasonic sensor.
Figure 4D:
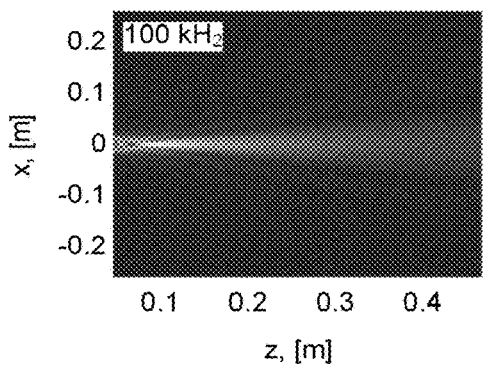
FIG. 4D is a diagram illustrating a relationship between a frequency (in the case of 100 kHz) and directivity of an ultrasonic sensor.

FIG. 3 is a schematic diagram of a sensor 10 according to the first embodiment. Examples of the sensor 10 as a non-contact sensor that detects a sound wave radiated in the air include an airborne ultrasonic sensor formed by using a piezoelectric element. The sensor 10 of the first embodiment includes a matching layer 11, a piezoelectric element 12, and a back layer 13.

Since there is a large difference between the acoustic impedance of the piezoelectric element 12 and the acoustic impedance of the air, the sensor 10 is provided with a matching layer 11 having an acoustic impedance intermediate between the acoustic impedance of the piezoelectric element and the acoustic impedance of the air.

The acoustic impedance of a typical piezoelectric material is approximately 30 [10e-6 Ns/m³], for example. The acoustic impedance of the air is 0.00041 [10e-6 Ns/m³]. The matching layer 11 often uses a resin material (for example, an epoxy resin or the like) having an acoustic impedance of 2 to 3 [10e-6 Ns/m³] as a matching material having an intermediate value between the two levels of impedance.

In addition, the sensor 10 of the first embodiment includes the back layer 13 having an acoustic impedance equivalent to that of the piezoelectric element 12 in order to suppress ringing occurring due to reflection behind the piezoelectric element 12.

The directivity of such a sensor 10 can be broadly considered as a problem of a sound field formed by a disc S having a radius $a_0$ that is embedded in an infinite rigid wall and vibrates at a velocity v and an angular frequency ω. Assuming a point a in the minute area dS on the disc and a point b in the space, the sound pressure p observed at the point b can be expressed by the following Rayleigh integral.

$$p = \frac{j\omega v\rho}{2\pi} \int \frac{e^{-j\omega kr}}{r} ds \quad (4)$$

$$r = |b - a|$$

Example of Sound Field Simulation Result

FIGS. 4A to 4D illustrate sound field simulation results when the radius of the disc is 20 mm, the velocity of the disc is 10 m/s, the sound velocity is 340 m/s, the density of the medium (the air) is 1.293 kg/m³, with various frequencies: 10 kHz, 20 kHz, 50 kHz, and 100 kHz. x=0 indicates the center of the disc, and z indicates the distance from the disc. From Equation (4) described above and the results of FIGS. 4A to 4D, it can be seen that the higher the frequency, the higher the directivity. At 100 kHz in particular, even at a distance of Z=200 mm, the higher sound pressure is maintained compared with the cases at frequencies lower than 100 kHz. It is reasonable to consider that the sensor 10 can vibrate the diaphragm (that is, sensing) with high sensitivity in a case where there is a sound source at a distance of Z=200 mm, and it can be seen that the sensor 10 has the directivity similar to the sound field simulation result of FIG. 4D.

Next, sound wave radiation into the air accompanying propagation of an elastic wave will be described.

Figure 5A:
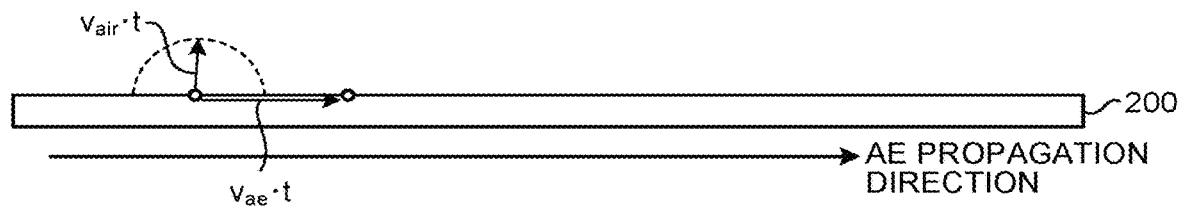
FIG. 5A is a diagram illustrating sound wave radiation into the air accompanying propagation of an elastic wave.
Figure 5B:
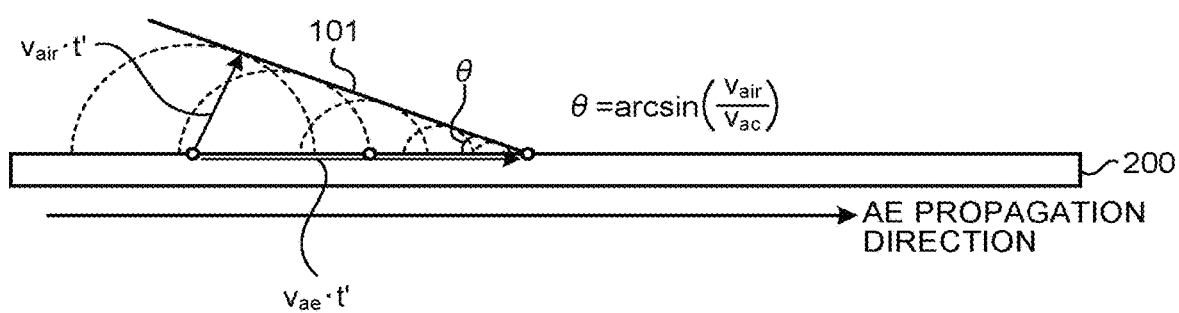
FIG. 5B is a diagram illustrating sound wave radiation into the air accompanying propagation of an elastic wave.

As illustrated in FIG. 5A, it is assumed to have a sound wave radiated from an elastic wave propagating in a solid (inspection object 200) at a velocity $v_{ae}$. A vibrating particle as a point sound source emits a sound wave into the air, and the emitted sound wave diffuses at a sound velocity $v_{air}$ in the air. The point sound source moves through the solid at the velocity $v_{ae}$. In a case where the time has elapsed by t' from time t, the sound wave created by the moved point sound source forms a wavefront in phase on a line inclined by an angle θ of the following equation (5) with respect to the horizontal plane as illustrated in FIG. 5B.

$$\theta = \arcsin\left(\frac{v_{air}}{v_{ae}}\right) \quad (5)$$

As an example of the inspection object 200 can be an aluminum plate having a thickness of 3 mm. In the case of a solid material, there are two types of elastic waves: longitudinal waves (p waves) and transverse waves (s waves). It is known that in the case of a thin plate, a reflected p wave and a reflected s wave are excited by reflection at an end surface to form a guide wave referred to as a Lamb wave as a whole. The guide wave can be obtained by providing a boundary condition in the wave equation. Note that the elastic wave of a solid material has a velocity dispersion characteristic that the propagation velocity changes according to the frequency.

Figure 6:
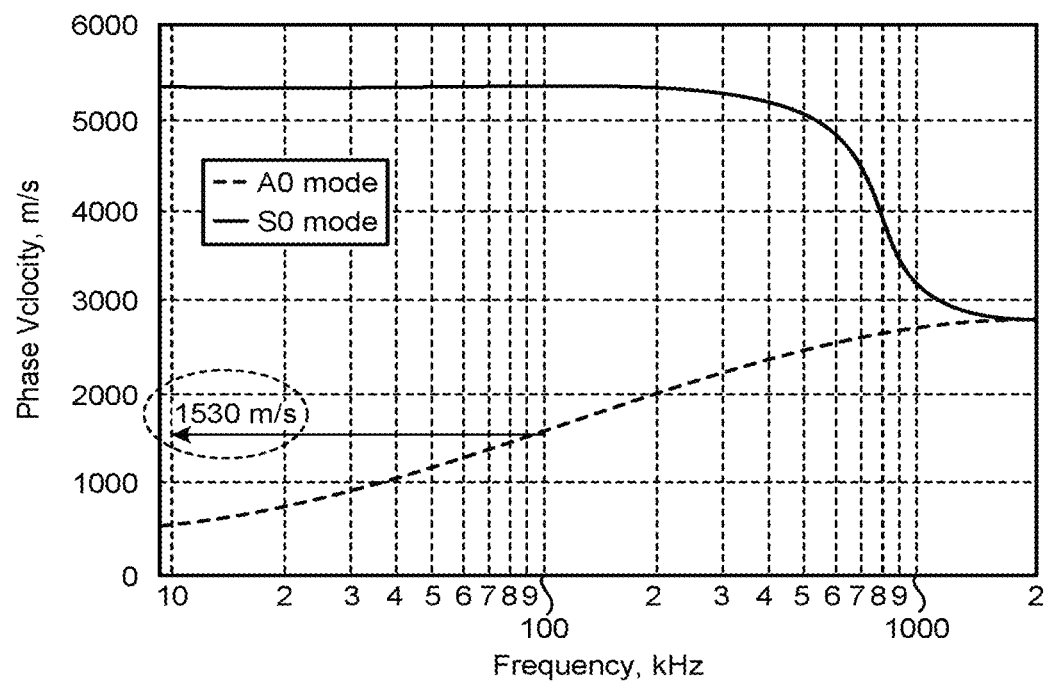
FIG. 6 is a diagram illustrating an example of a velocity dispersion characteristic of an aluminum plate.

FIG. 6 is a diagram illustrating an example of a velocity dispersion characteristic of an aluminum plate. The example of FIG. 6 illustrates a result of calculating the velocity dispersion characteristic for an aluminum plate having a thickness of 3 mm. A mode in which the aluminum plate is deformed symmetrically is referred to as a symmetry mode (S mode), and a mode in which the aluminum plate is deformed asymmetrically is called an anti-symmetry mode (A mode). The higher the order, the higher the frequency. FIG. 6 displays only the lowest-order modes (S0 mode and A0 mode).

Generally, the S mode is characterized by high velocity and small amplitude, while the A mode is characterized by low velocity and large amplitude. When the elastic wave has frequency 100 kHz, the propagation velocity $v_{lamb\_A0}$ of the A0 mode is 1530 m/s. When 340.29 m/s is used for the sound velocity $v_{air}$ in the air, the wavefront angle ° air at this time can be derived as in the following equation (6) based on the above equation (5).

$$\theta_{air} = \arcsin\left(\frac{v_{air}}{v_{lamb\_A0}}\right) \cong 12.85[deg] \quad (6)$$

From the above, it is found that a sound wave is generated in a surrounding medium along with propagation of an elastic wave in a solid, and a radiation angle (wavefront angle) of the sound wave is determined by a ratio between the propagation velocity in the solid and a sound velocity in the air.

Next, a configuration of the non-contact non-destructive inspection system according to the first embodiment will be described.

Example of Configuration of Non-Contact Non-Destructive Inspection System

Figure 7:
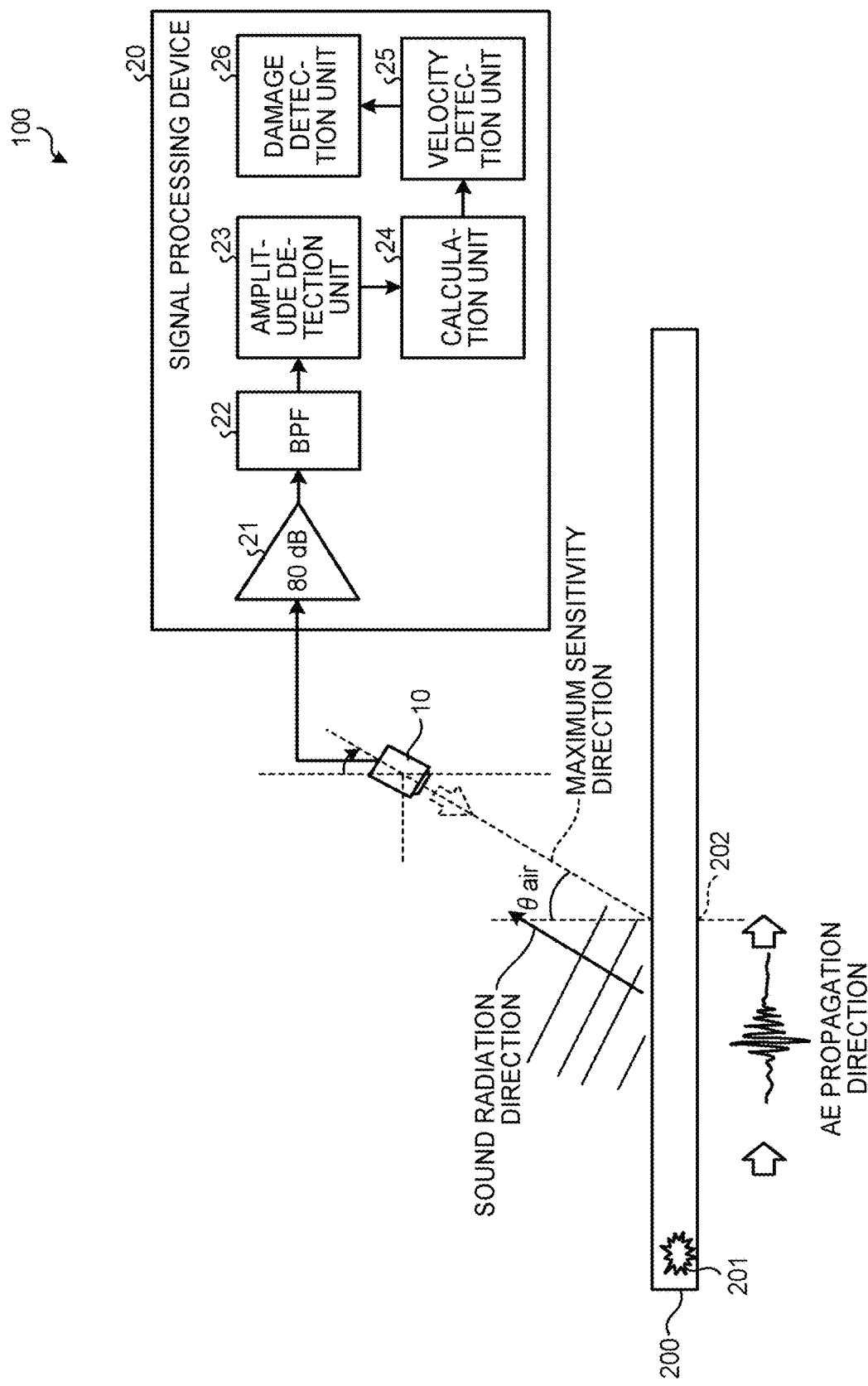
FIG. 7 is a diagram illustrating an example of a configuration of a non-contact non-destructive inspection system according to the first embodiment.

FIG. 7 is a diagram illustrating an example of a configuration of a non-contact non-destructive inspection system 100 according to the first embodiment. The non-contact non-destructive inspection system 100 of the first embodiment includes a sensor 10 and a signal processing device 20.

When AE associated with crack development or the like is generated from a damaged portion 201 of the inspection object 200, AE propagates in the solid. Along with the propagation, a sound wave having a predetermined wavefront angle is secondarily radiated. The emitted sound wave is observed by the sensor 10.

The sensor 10 includes a mechanism of adjusting an angle of the sensor 10 according to a control signal. For example, the sensor 10 includes a rotation mechanism of rotating the sensor 10 in response to a control signal from the signal processing device 20. The rotation mechanism adjusts the angle of the sensor 10 that detects the sound wave. The observation frequency of the sound wave is desirably 100 kHz or more. The piezoelectric element of the sensor 10 detects a sound wave radiated into the air and generates a voltage signal. An example of the waveform of the detected voltage signal is illustrated in FIG. 8.

Figure 8:
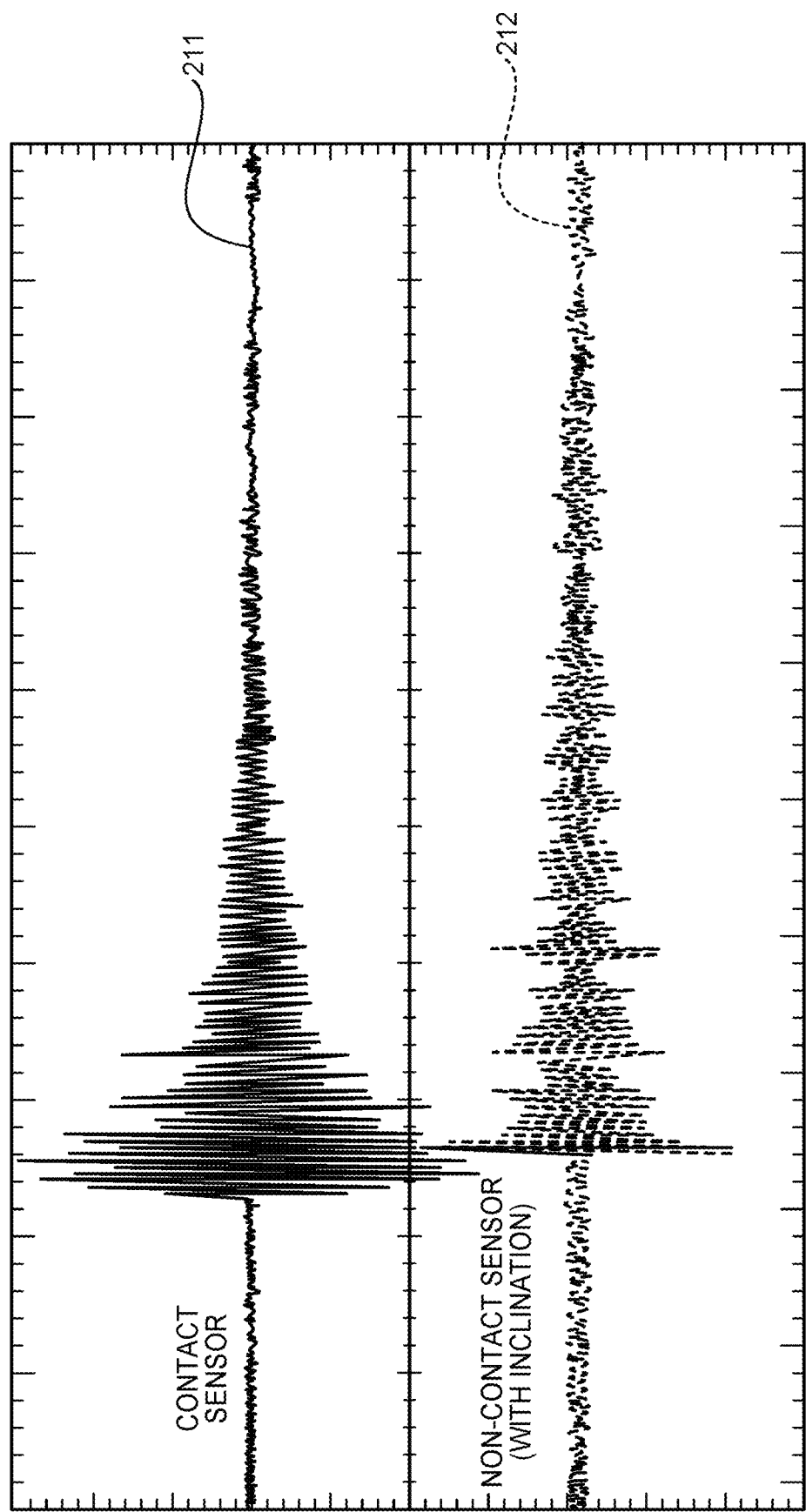
FIG. 8 is a diagram illustrating an example of a waveform detected by the sensor of the first embodiment.

FIG. 8 is a diagram illustrating an example of a waveform detected by the sensor 10 of the first embodiment. A waveform 211 indicates a waveform detected when a contact sensor is disposed at a position 202 of the inspection object 200. A waveform 212 indicates a waveform detected by the sensor 10. Since the sensor 10 is a non-contact sensor, the change in the waveform 212 detected by the sensor 10 arises later than the waveform 211 detected by the contact sensor disposed at the position 202.

Returning to FIG. 7, the signal processing device 20 includes an amplifier 21, a Band-pass filter (BPF) 22, an amplitude detection unit 23, a calculation unit 24, and a velocity detection unit 25. Note that the amplifier 21 and the BPF 22 may be provided in a device outside the signal processing device 20.

The amplifier 21 amplifies the voltage signal received from the sensor 10 by approximately 40 dB to 80 dB and transmits the amplified voltage signal to the BPF 22.

The BPF 22 removes noise outside the observation band from the voltage signal received from the amplifier 21, and inputs the voltage signal from which the noise has been removed to the amplitude detection unit 23.

The amplitude detection unit 23 detects amplitude information from the voltage signal input from the BPF 22 and then inputs the detected amplitude information to the amplitude detection unit 23.

Based on the amplitude information input from the amplitude detection unit 23, the calculation unit 24 calculates the angle of the sensor 10 having the greater detected amplitude as the wavefront angle $\theta_{air}$. For example, the calculation unit 24 controls the rotation mechanism of the sensor 10 to rotate the sensor 10, and calculates the angle at which the amplitude of the AE signal has the maximum sensitivity, as the wavefront angle $\theta_{air}$. Furthermore, for example, the calculation unit 24 calculates an angle that maximizes the average value of the AE signals obtained a plurality of times, as the wavefront angle ° air. The calculation unit 24 inputs the calculated wavefront angle $\theta_{air}$ to the velocity detection unit 25.

The velocity detection unit 25 substitutes the wavefront angle $\theta_{air}$ input from the calculation unit 24 and the sound velocity $v_{air}$ in the air into the above equation (5) to detect the velocity $v_{ae}$ of the elastic wave in the inspection object 200.

When the wavefront angle $\theta_{air}$ is included in the process of calculation, the wavefront angle $\theta_{air}$ does not need to be explicitly calculated, and it is allowable to detect the velocity $v_{ae}$ of the elastic wave as a result of calculation.

When the inspection object 200 is plate-shaped such as a thin plate, the thickness of the inspection object 200 can also be estimated from the comparison between the velocity dispersion characteristic of the Lamb wave and the velocity $v_{ae}$ of the elastic wave described above. By estimating the thickness, damage such as internal peeling and thinning can be detected.

In addition, the velocity $v_{ae}$ of the elastic wave can also be applied to specifying the propagation mode (for example, A0 mode, S0 mode, or the like) based on the Lamb wave theory. It is known that, when the damaged portion 201 that has caused occurrence of the AE exists near the center portion of the thickness, the propagation mode becomes symmetric and the S0 mode is excited. In contrast, when AE occurs at the damaged portion 201 near the surface, the A0 mode becomes dominant. In this manner, the position in the depth direction is related to the propagation mode, and thus, specifying the propagation mode from the velocity $v_{ae}$ of the elastic wave makes it possible to specify the position in the depth direction as well. A damage detection unit 26 estimates the propagation mode of the Lamb wave from the velocity $v_{ae}$ of the elastic wave, and detects the depth of a position of the damage to the inspection object 200 from the propagation mode.

In addition, acquisition of the direction of the vector indicating the wavefront angle $\theta_{air}$ will make it possible to simultaneously obtain the direction of the elastic wave in which the AE propagates (propagation direction of the AE arriving at the position 202). By specifying, using the damage detection unit 26, the propagation direction of the AE arriving at each point from the direction of the vector indicating the wavefront angle $\theta_{air}$ of at least two sensors 10 arranged spaced apart from each other, for example, it will be possible to achieve two-dimensional locating of an AE generation source (damaged portion 201).

As described above, in the non-contact non-destructive inspection system 100 of the first embodiment, the sensor 10 detects the sound wave (second elastic wave) emitted to the medium (the air in the first embodiment) surrounding the inspection object 200 due to the AE (first elastic wave) propagating through the inspection object 200. The velocity detection unit 25 detects the velocity $v_{ae}$ of the first elastic wave based on the wavefront angle $\theta_{air}$ of the second elastic wave and the velocity $v_{air}$ of the second elastic wave. Subsequently, the damage detection unit 26 detects the damage to the inspection object 200 based on the velocity $v_{ae}$ of the first elastic wave.

According to this configuration of the first embodiment, it is possible to perform non-contact evaluation of the soundness of the inspection object 200. For example, the first embodiment can be broadly applied to AE inspection of relatively moving members such as a rotating body and a moving body, to which application of the AE method has been difficult in the past. In addition, for example, by mounting the sensor 10 on an aerial vehicle such as a drone, it is possible to perform remote AE inspection on a large structure as well. Furthermore, for example, by mounting the sensor 10 on a vehicle traveling on a road, a railway vehicle traveling on a rail, and the like, it is also possible to perform AE inspection of a road surface, a railway track, and the like.

Second Embodiment

Next, a second embodiment will be described. In the description of the second embodiment, the description different from the first embodiment will be described, omitting portions similar to that of the first embodiment. The second embodiment will describe a configuration that calculates the velocity $v_{ae}$ of the elastic wave using the amplitude ratio (a normalized amplitude ratio in the second embodiment) of the elastic wave detected by two sensors 10.

Example of Configuration of Non-Contact Non-Destructive Inspection System

Figure 9:
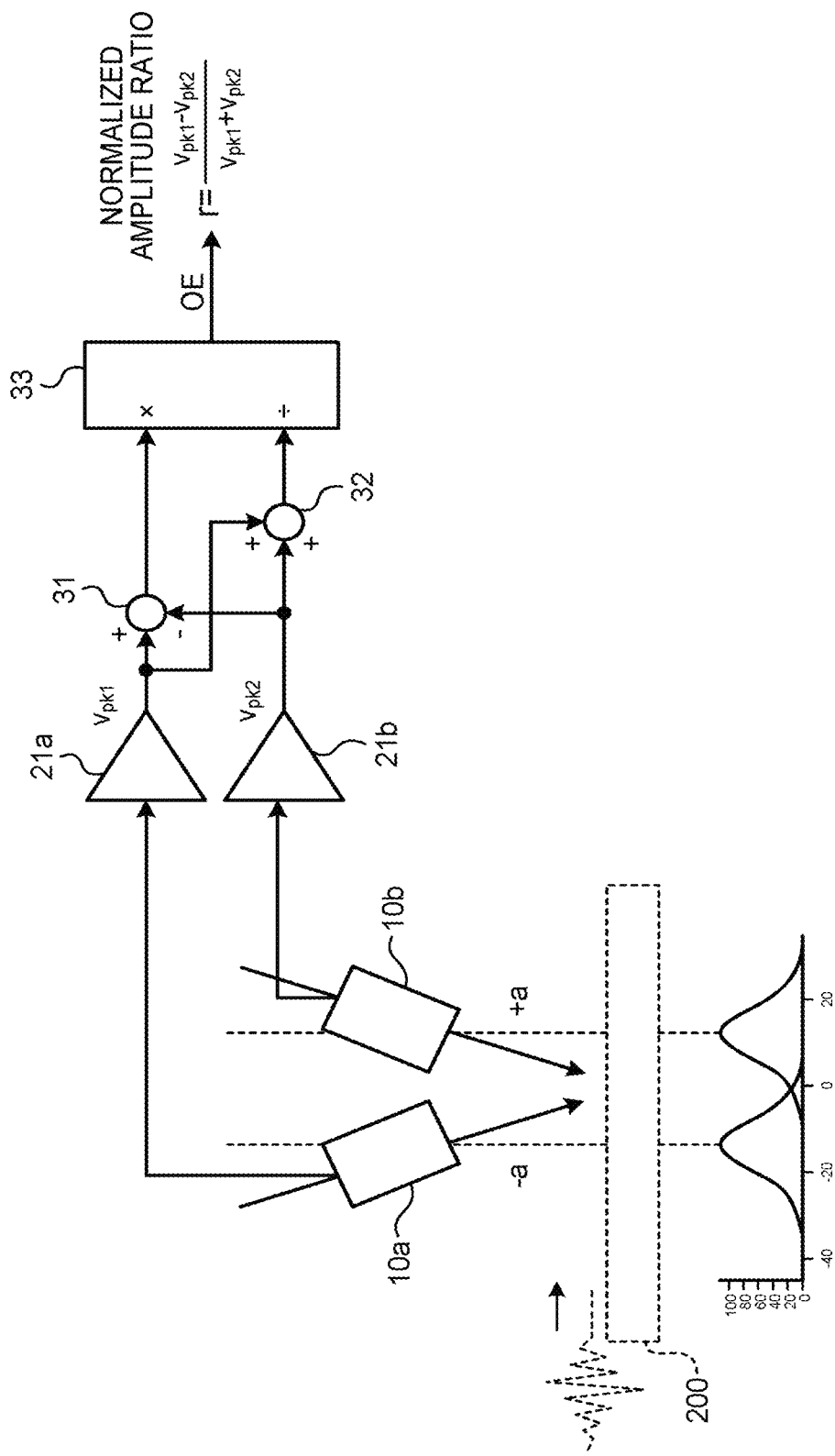
FIG. 9 is a diagram illustrating a configuration of a non-contact non-destructive inspection system according to a second embodiment.

FIG. 9 is a diagram illustrating a configuration of a non-contact non-destructive inspection system according to the second embodiment. The non-contact non-destructive inspection system of the second embodiment includes sensors 10a and 10b, amplifiers 21a and 21b, and arithmetic units 31 to 33.

The sensors 10a and 10b are disposed at mutually different positions, and angles (maximum sensitivity directions) of the sensors 10a and 10b are different.

The velocity detection unit 25 of the second embodiment detects the velocity of the AE (first elastic wave) based on the amplitude ratio of the sound wave (second elastic wave) detected by each of the sensors 10a and 10b. Specifically, the velocity detection unit 25 calculates the velocity $v_{ae}$ of the elastic wave by the following equation (7). Note that a coefficient k is a constant calibrated in advance based on the directivity and the angle conditions of the sensors 10a and 10b.

$$v_{ae} = v_{air} \cdot \sin^{-1}\left(k \cdot \frac{v_{pk1} - v_{pk2}}{v_{pk1} + v_{pk2}}\right) \quad (7)$$

A configuration of calculating the normalized amplitude ratio included in the above equation (7) will be described. The amplifier 21a amplifies the voltage signal received from the sensor 10a. Similarly, the amplifier 21b amplifies the voltage signal received from the sensor 10b. The arithmetic unit 31 receives the voltage signals from the amplifiers 21a and 21b, and calculates a numerator of the normalized amplitude ratio. The arithmetic unit 32 receives the voltage signal from amplifiers 21a and 21b, and calculates a denominator of the normalized amplitude ratio. The arithmetic unit 33 receives arithmetic results from the arithmetic units 31 and 32, calculates the normalized amplitude ratio, and inputs the calculated normalized amplitude ratio to the velocity detection unit 25.

Figure 10:
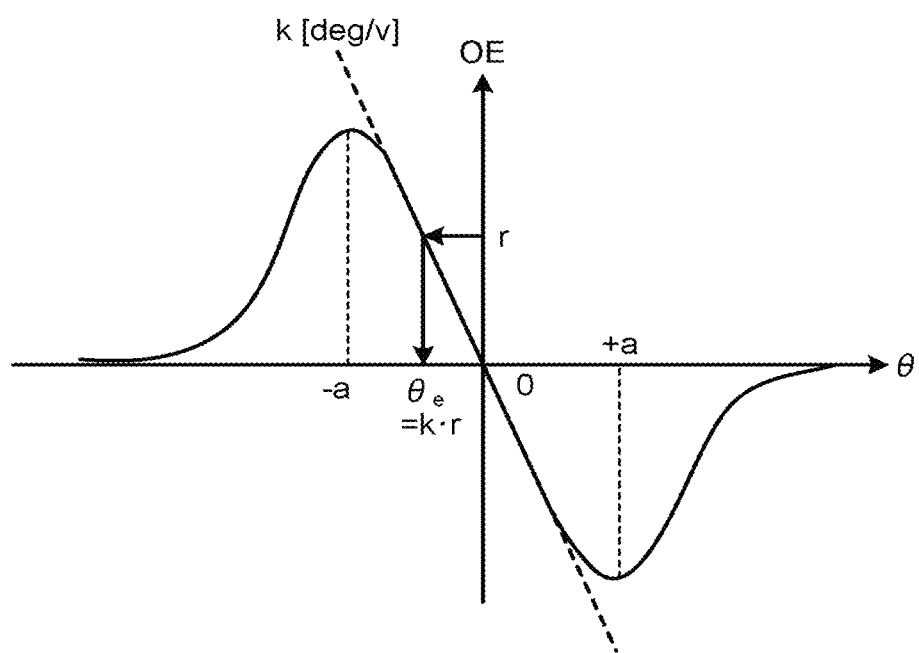
FIG. 10 is a diagram illustrating a normalized amplitude ratio according to the second embodiment.

FIG. 10 is a diagram illustrating a normalized amplitude ratio r according to the second embodiment. k is the above-described coefficient, $-a$ is the angle of the sensor 10a, and $+a$ is the angle of the sensor 10b. The normalized amplitude ratio r is maximized at an angle: $\theta = -a$ and minimized at an angle: $\theta = +a$.

According to the second embodiment, the velocity $v_{ae}$ of the elastic wave can be directly calculated by the above equation (7) from the normalized amplitude ratio r of the voltage signal detected by the sensors 10a and 10b respectively.

Third Embodiment

Next, a third embodiment will be described. In the description of the third embodiment, the description different from the first embodiment will be described, omitting portions similar to that of the first embodiment. The third embodiment will describe a case where an elastic wave is detected by a sensor array including an array of plural sensors 10 (sensor elements) in which a maximum sensitivity direction is varied.

FIG. 11A is a diagram illustrating an example of a sensor array 40a according to the third embodiment. In the sensor array 40a of FIG. 11A, the plural sensors 10 are arranged on the circumference of the inspection object 200. The arrangement positions do not necessarily have to be on the circumference as long as the maximum sensitivity directions are differentiated for each of elements. Note that the number of sensors 10 to be arranged may be arbitrary.

FIG. 11B is a diagram illustrating an example of a sensor array 40b according to the third embodiment. In the sensor array 40b of FIG. 11B, plural sensors 10 having mutually different orientations is arranged on a straight line parallel to the inspection object 200. Note that the number of sensors 10 to be arranged may be arbitrary.

As illustrated in FIGS. 11A and 11B, the plural sensors 10 are arranged with angles in advance, and the calculation unit 24 obtains the angle of the sensor 10 having the greater detected amplitude of the elastic wave as an optimum inclination angle, making it possible to detect the wavefront angle $\theta_{air}$ from the AE wave generated once. In the case of FIGS. 11A and 11B, the amplitude of the detected signal is maximum in the sensor 10c whose maximum sensitivity direction matches the radiation angle among the sensor arrays 40a and 40b, and thus, the angle of the sensor 10c can be obtained as the radiation angle.

In addition, plural sensor arrays 40a (or sensor arrays 40b) can be arranged at mutually different locations to specify the three-dimensional position of the damaged portion 201. Specifically, the damage detection unit 26 specifies the position of the damaged portion 201 that causes generation of the AE (first elastic wave) based on, for example, the direction of the vector indicating the wavefront angle $\theta_{air}$ of the sound wave (second elastic wave) detected by at least two sensor arrays 40a, the sound velocity in the air, and the elastic wave propagation velocity in the inspection object 200.

Figure 12:
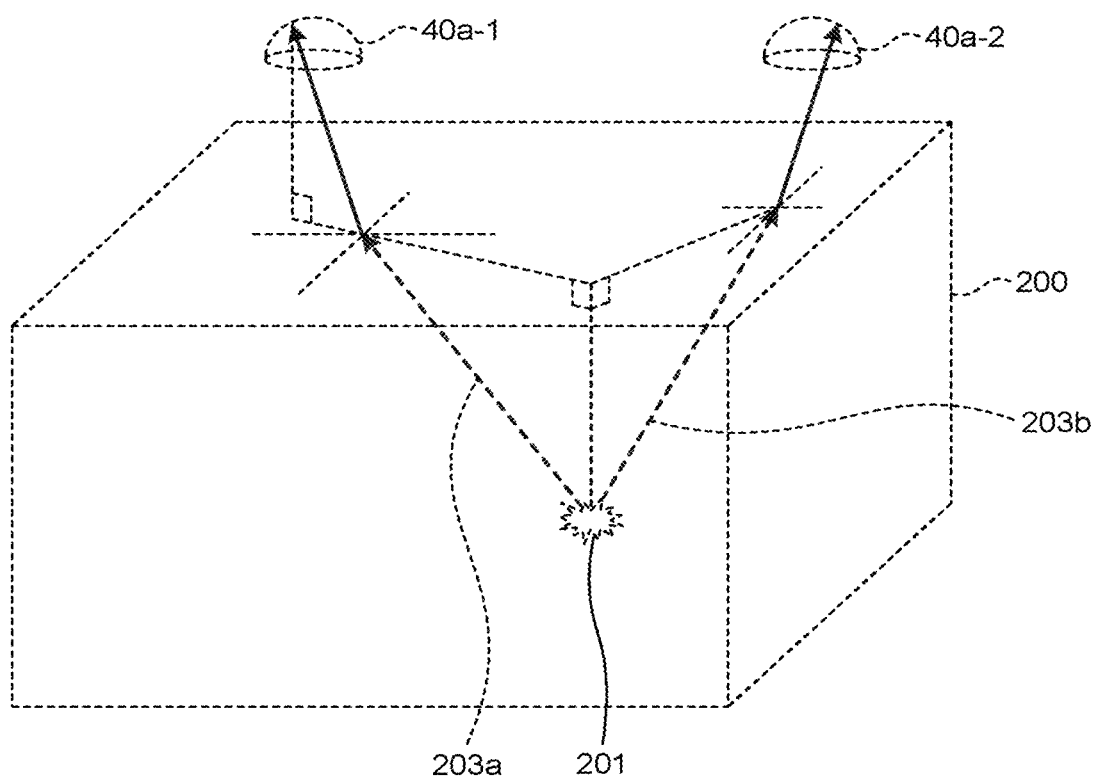
FIG. 12 is a conceptual diagram of three-dimensional locating (position locating) according to the third embodiment.

FIG. 12 is a conceptual diagram of three-dimensional locating according to the third embodiment. The example of FIG. 12 illustrates a case of performing three-dimensional locating using two sensor arrays 40a-1 and 40a-2 including the plural sensors 10 arranged on a hemispherical surface. The AE generated in the damaged portion 201 inside the inspection object 200 such as a material is radiated into the air. The damage detection unit 26 calculates propagation vectors 203a and 203b in the inspection object 200 based on the radiation angles detected by the sensor arrays 40a-1 and 40a-2, the sound velocity in the air, and the elastic wave propagation velocity in the inspection object 200. As illustrated in FIG. 12, the position of the damaged portion 201 is detected as an intersection of the two propagation vectors 203a and 203b.

According to the third embodiment, the sensor array 40a or 40b can be used to detect the wavefront angle $\theta_{air}$ and detect the position of the damaged portion 201. Note that the position of the damaged portion 201 may be specified by arranging one sensor 10 including a mechanism for adjusting the inclination angle at each installation location.

Fourth Embodiment

Next, a fourth embodiment will be described. In the description of the fourth embodiment, the description different from the first embodiment will be described, omitting portions similar to that of the first embodiment. In the fourth embodiment, a case where the sensor 10 is applied to filtering of an elastic wave will be described.

The sensor 10 of the fourth embodiment includes a mechanism of adjusting an angle of the sensor 10 based on a control signal including an angle based on a propagation velocity of AE (first elastic wave) determined according to a material of the inspection object 200 and including a direction of the first elastic wave being an inspection target.

In addition, the calculation unit 24 of the fourth embodiment further includes a function of inclining the sensor 10 at a predetermined angle (optimum inclination angle) according to the material of the inspection object 200 with reference to a lookup table storing the propagation velocity of the elastic wave for each material. The inclination angle of the sensor 10 is determined according to the material of the inspection object 200, and the sensor 10 is caused to be inclined in a positive or negative direction based on the direction of the elastic wave being the inspection target, making it possible to filter the elastic waves. Specifically, the calculation unit 24 adjusts the angle of the sensor 10 by transmitting the above-described control signal to the sensor 10 using a communication IF of the signal processing device 20, for example.

Figure 13:
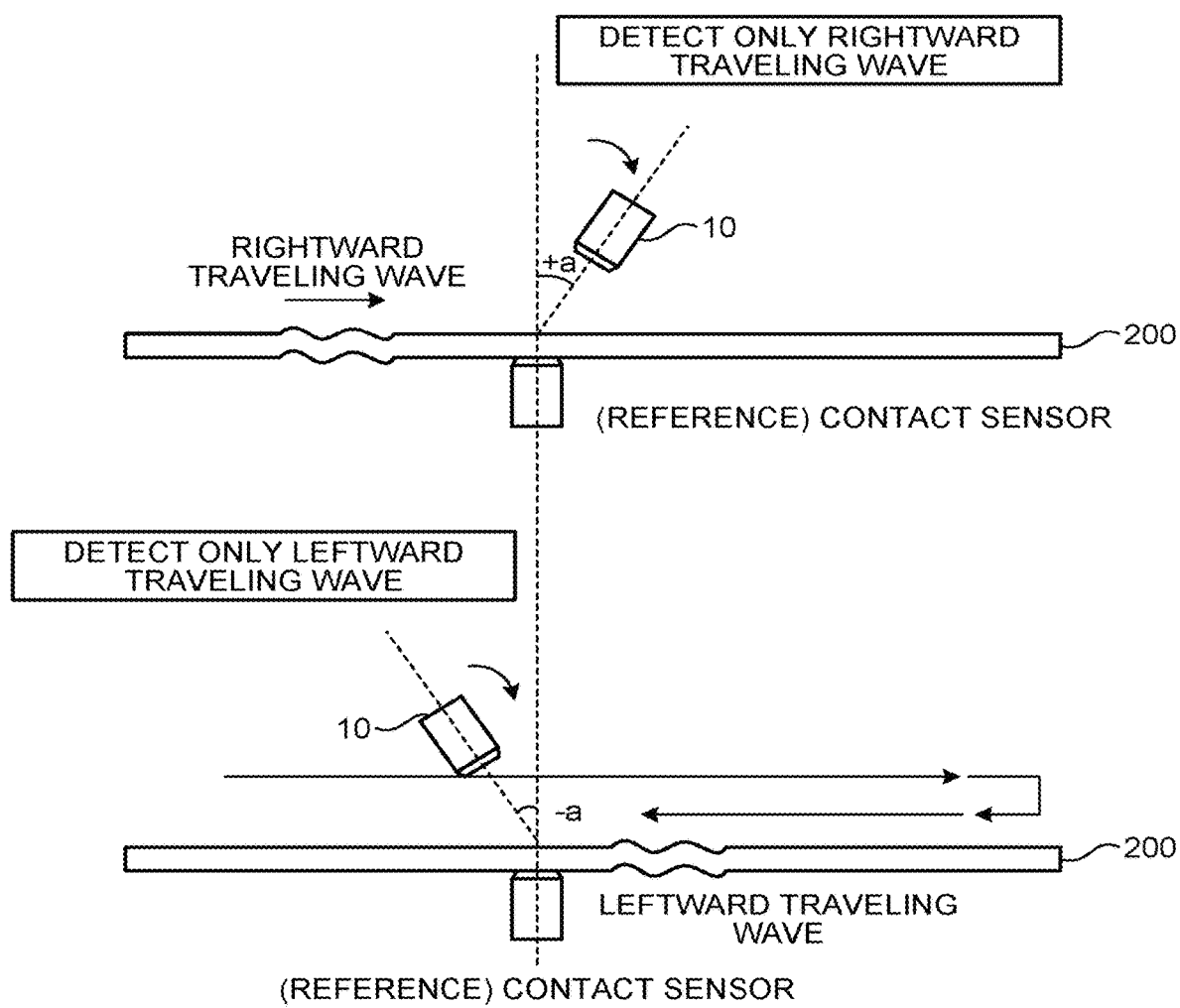
FIG. 13 is a conceptual diagram of filtering in an elastic wave traveling direction according to a fourth embodiment.

FIG. 13 is a conceptual diagram of filtering (directional filtering) by an elastic wave traveling direction according to the fourth embodiment. A leftward traveling wave in FIG. 13 is generated by reflection of the rightward traveling wave at an end of the inspection object 200. As illustrated in FIG. 13, the traveling direction of the detected elastic wave can be selected by the direction in which the angle of the sensor 10 is inclined.

Figure 14:
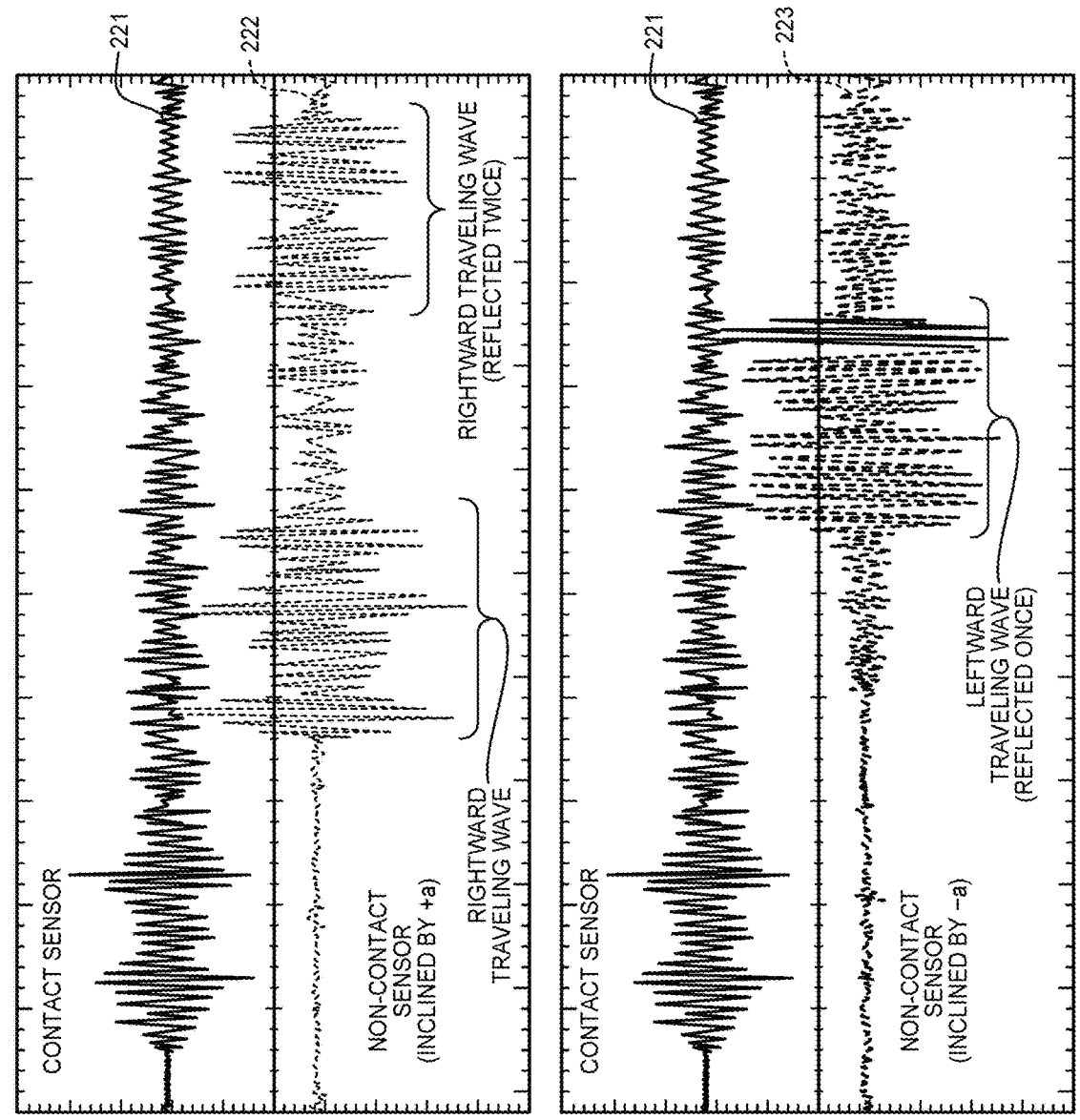
FIG. 14 is a diagram illustrating an example of a waveform detected by a sensor of the fourth embodiment.

FIG. 14 is a diagram illustrating an example of a waveform detected by the sensor 10 of the fourth embodiment. A waveform 221 is a waveform detected in a case where the contact sensor is disposed with respect to the inspection object 200 as illustrated in FIG. 13 for reference. A waveform 222 is a waveform detected in a case where the sensor 10 is disposed with an inclination by an angle +a with respect to the inspection object 200. The waveform 222 includes the sound wave emitted into the air due to the rightward traveling wave propagating through the inspection object 200, and does not include the sound wave emitted into the air due to the leftward traveling wave. In contrast, a waveform 223 is a waveform detected in a case where the sensor 10 is disposed with an inclination by an angle −a with respect to the inspection object 200. The waveform 223 includes the sound wave emitted into the air due to the leftward traveling wave propagating through the inspection object 200, and does not include the sound wave emitted into the air due to the rightward traveling wave.

According to the fourth embodiment, when a noise generation source exists in a specific direction of the inspection object 200, for example, the effect of filtering can be obtained by inclining the sensor 10 so as not to detect noise from the noise generation source. By a similar principle, filtering of reflected waves, filtering by velocity, and filtering by propagation mode are possible.

Finally, an example of a hardware configuration of the signal processing device 20 according to the first to fourth embodiments will be described.

Example of Hardware Configuration

Figure 15:
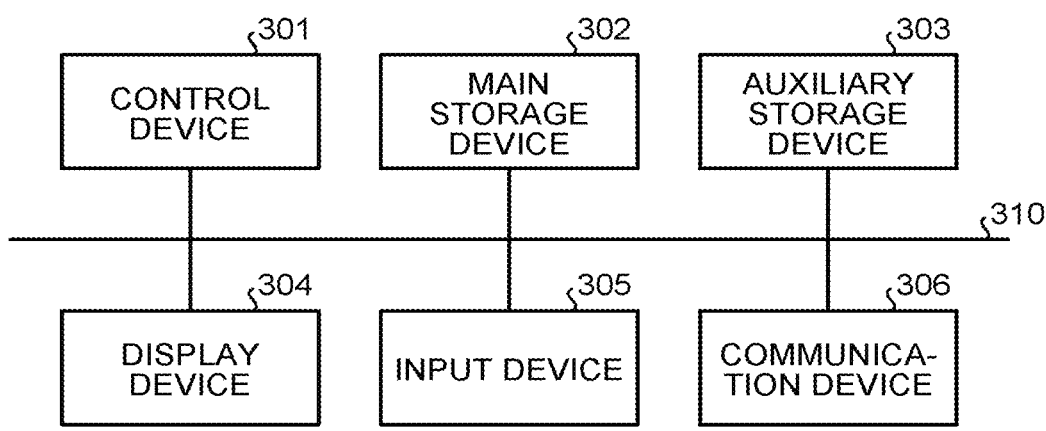
FIG. 15 is a diagram illustrating an example of a hardware configuration of a signal processing device according to the first to fourth embodiments.

FIG. 15 is a diagram illustrating an example of a hardware configuration of the signal processing device 20 according to the first to fourth embodiments.

The signal processing device 20 is a computer including a control device 301, a main storage device 302, an auxiliary storage device 303, a display device 304, an input device 305, and a communication device 306. The control device 301, the main storage device 302, the auxiliary storage device 303, the display device 304, the input device 305, and the communication device 306 are interconnected via a bus 310.

The control device 301 executes a program read out from the auxiliary storage device 303 to the main storage device 302. The main storage device 302 is a memory such as read only memory (ROM) and random access memory (RAM). The auxiliary storage device 303 includes a hard disk drive (HDD), a solid state drive (SSD), a memory card, or the like.

The display device 304 displays display information. The display device 304 is, for example, a liquid crystal display or the like. The input device 305 is an interface for operating a computer. Examples of the input device 305 include a keyboard, a mouse, and the like. When the computer is a smart device such as a tablet terminal, the display device 304 and the input device 305 are actualized by a touch panel, for example.

The communication device 306 is an interface for communicating with other devices. Note that the signal processing device 20 does not have to include the display device 304 or the input device 305, and may use a display function and an input function of an external terminal communicable via the communication device 306.

The program executed on the computer is recorded in a computer-readable recording medium such as a CD-ROM, a memory card, a CD-R, and a Digital Versatile Disc (DVD) in a file of an installable format or an executable format and provided as a computer program product.

Moreover, the program executed on the computer may be stored on a computer connected to a network such as the Internet and provided by being downloaded via the network. The program executed on the computer may be provided via a network such as the Internet, rather than being downloaded.

Moreover, the program executed on the computer may be provided by being incorporated in the ROM or the like, in advance.

The program executed on the computer is in a modular configuration including functional blocks that can be implemented by the program, out of the above-described functional configurations (functional blocks) of the signal processing device 20. Regarding each of the relevant functional blocks, the control device 301 as the actual hardware reads out the computer program from the recording medium and executes the program, thereby loading each of the above-described functional blocks on the main storage device 302. That is, the above-described various functional blocks are generated on the main storage device 302.

Part of or a whole of the above-described various functional blocks may be implemented by the hardware such as an integrated circuit (IC) instead of being implemented by the software.

When implementing various functions by using a plurality of hardware processors, each of the processors may implement one out of the various functions or may implement two or more of the various functions.

In addition, the operation form of the computer that actualizes the signal processing device 20 may be arbitrary. For example, the signal processing device 20 may be actualized by one computer. Furthermore, for example, the signal processing device 20 may be used to operate as a cloud system on a network so as to receive signals from the plural sensors 10.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A non-contact non-destructive inspection system comprising:
    a sensor configured to detect a second elastic wave emitted to a medium surrounding an inspection object due to a first elastic wave propagating through the inspection object;
    a memory; and
    one or more hardware processor coupled to the memory and configured to:
        detect a velocity of the first elastic wave based on a wavefront angle of the second elastic wave and a velocity of the second elastic wave; and
        detect damage to the inspection object based on the velocity of the first elastic wave.

2. The non-contact non-destructive inspection system according to claim 1, wherein
    the sensor includes a mechanism of adjusting an angle of the sensor according to a control signal, and
    the one or more hardware processor is further configured to calculate an angle of the sensor having a greater detected amplitude of the second elastic wave, as the wavefront angle.

3. The non-contact non-destructive inspection system according to claim 2, wherein
    for the sensor, plural sensors are installed at mutually different positions, and
    the one or more hardware processor is configured to specify a position of a damaged portion that causes generation of the first elastic wave based on a direction of a vector indicating a wavefront angle of the second elastic wave detected by at least two of the sensors, a sound velocity in the medium, and the velocity of the first elastic wave.

4. The non-contact non-destructive inspection system according to claim 1, wherein the sensor includes a mechanism of adjusting an angle of the sensor according to a control signal including an angle based on a propagation velocity of the first elastic wave determined according to a material of the inspection object and including a direction of the first elastic wave being an inspection target.

5. The non-contact non-destructive inspection system according to claim 1, wherein
    the sensor includes a first sensor and a second sensor disposed at a position different from a position of the first sensor and at an angle different from an angle of the first sensor, and
    the one or more hardware processor is configured to detect the velocity of the first elastic wave based on an amplitude ratio of the second elastic wave detected by the first sensor and the second sensor respectively.

6. The non-contact non-destructive inspection system according to claim 1, wherein
    the sensor is configured as a sensor array,
    the sensor array includes plural sensor elements arranged at mutually different angles, and the one or more hardware processor is configured to calculate an angle of the sensor element having a greater detected amplitude of the second elastic wave, as the wavefront angle.

7. The non-contact non-destructive inspection system according to claim 6, wherein
for the sensor array, plural sensor arrays are installed at mutually different positions, and
the one or more hardware processor is configured to specify a position of a damaged portion that causes generation of the first elastic wave based on a direction of a vector indicating a wavefront angle of the second elastic wave detected by at least two of the sensor arrays, a sound velocity in the medium, and the velocity of the first elastic wave.

8. The non-contact non-destructive inspection system according to claim 1, wherein
the inspection object is plate-shaped, and
the one or more hardware processor is configured to:
estimate a thickness of the inspection object by comparing a velocity dispersion characteristic of a Lamb wave propagating through the inspection object with a velocity of the first elastic wave, and
detect at least one of internal peeling or thinning of the inspection object based on the thickness of the inspection object.

9. The non-contact non-destructive inspection system according to claim 8, wherein the one or more hardware processor is configured to:
estimate a propagation mode of the Lamb wave based on the velocity of the first elastic wave, and
detect a depth of a position of the damage to the inspection object based on the propagation mode.

10. A signal processing device comprising:
a memory; and
one or more hardware processor coupled to the memory and configured to
detect a velocity of a first elastic wave propagating through an inspection object based on a wavefront angle of a second elastic wave emitted to a medium surrounding the inspection object due to the first elastic wave, and based on a velocity of the second elastic wave; and
detect damage to the inspection object based on the velocity of the first elastic wave.

11. A non-contact non-destructive inspection method comprising:
detecting, by a sensor, a second elastic wave emitted to a medium surrounding an inspection object due to a first elastic wave propagating through the inspection object;
detecting, by one or more hardware processor of a signal processing device, a velocity of the first elastic wave based on a wavefront angle of the second elastic wave and a velocity of the second elastic wave; and
detecting, by the one or more hardware processors, damage to the inspection object based on the velocity of the first elastic wave.

* * * * *